United States Patent
Takeda

(10) Patent No.: US 6,861,139 B2
(45) Date of Patent: Mar. 1, 2005

(54) PRESSURE SENSITIVE ADHESIVE COMPOSITION AND ADHESIVE PRODUCT USING THE SAME

(75) Inventor: Satoshi Takeda, Sagamihara (JP)

(73) Assignee: 3M Innovative Properties Company, Saint Paul, MN (US)

(*) Notice: Subject to any disclaimer, the term of this patent is extended or adjusted under 35 U.S.C. 154(b) by 138 days.

(21) Appl. No.: 10/230,538

(22) Filed: Aug. 29, 2002

(65) Prior Publication Data

US 2003/0091816 A1 May 15, 2003

Related U.S. Application Data

(63) Continuation of application No. 09/623,768, filed as application No. PCT/US99/06903 on Mar. 30, 1999, now abandoned.

(30) Foreign Application Priority Data

Apr. 17, 1998 (JP) .......................................... 10-108024

(51) Int. Cl.$^7$ ............................ C09J 7/02; C09J 123/28
(52) U.S. Cl. ................... 428/343; 428/356; 428/355 R; 428/355 EN; 524/273
(58) Field of Search ................................ 428/343, 356, 428/355 R, 355 EN; 524/273

(56) References Cited

U.S. PATENT DOCUMENTS

| | | |
|---|---|---|
| RE24,906 E | 12/1960 | Ulrich |
| 4,415,615 A | 11/1983 | Esmay et al. |
| 4,981,912 A | 1/1991 | Kurihara |
| 5,234,987 A | 8/1993 | Hubbard et al. |
| 5,242,727 A | 9/1993 | Briddell et al. |
| 5,409,987 A | 4/1995 | Kalwara et al. |
| 5,910,543 A | 6/1999 | Patel et al. |
| 6,013,727 A | 1/2000 | Dharmarajan et al. |

FOREIGN PATENT DOCUMENTS

| | | |
|---|---|---|
| JP | 7-138447 | 5/1995 |
| WO | WO 92/16569 | 10/1992 |

*Primary Examiner*—Daniel Zirker
(74) *Attorney, Agent, or Firm*—Douglas B. Little

(57) ABSTRACT

A pressure sensitive adhesive composition which exhibits excellent adhesive strength and holding characteristics within a wide temperature range from ultra-low temperature to high temperature without causing environmental problems is disclosed. The pressure sensitive adhesive composition comprises a random copolymer of isobutylene and paramethylstyrene, and a tackifier, wherein said random copolymer contains 1 to 20% by weight of said paramethylstyrene and has a cross-linked structure. The adhesive composition is particularly useful in forming weather-strip tapes.

10 Claims, No Drawings

US 6,861,139 B2

PRESSURE SENSITIVE ADHESIVE COMPOSITION AND ADHESIVE PRODUCT USING THE SAME

CROSS REFERENCE TO RELATED APPLICATIONS

This application is a continuation of U.S. application Ser. No. 09/623,768, now abandoned, filed Sep. 5, 2000; which was a national stage filing under 35 U.S.C. 371 of PCT/US99/06903, filed Mar. 30, 1999, which International Application was published by the International Bureau in English on Oct. 28, 1999; which claims priority to Japanese Application No. 10/108024, filed Apr. 17, 1998.

DETAILED DESCRIPTION OF THE INVENTION

1. Field of Utilization in Industry

The present invention relates a pressure sensitive adhesive composition, and an adhesive product using the same. The pressure sensitive adhesive composition of the present invention can be advantageously used, for example, when automobile parts made of a rubber are attached to the predetermined portion of the automobile.

2. Background

As is generally known, peripheral portions of the door portion of the automobile or other vehicles are provided with rubber parts, which isolate the inside of the automobile from wind, rain, dust, etc. and also operate as a soundproofing material, i.e. so-called "weather-strip". The weather-strip is normally formed from a terpolymer (EPDM) composed of three components, e.g. ethylene, propylene and diene to obtain excellent flexibility, oxidation resistance and aging resistance.

When the weather-strip of EPDM is attached to a predetermined portion of vehicles such as automobile, etc., a mechanical fixing means such as fitting using a crimp, a channel, etc. is generally used. The reason is that EPDM is a material having low surface energy and low adhesion and various adhesives are commercially available, but there is no pressure sensitive adhesive which is effective for attachment of a weather-strip made of EPDM to the vehicle. Attachment of automobile parts made of EPDM other than the weather strip and other members made of EPDM are performed by using a mechanical fixing means. However, since use of mechanical means has drawbacks such as complicated operation, high cost, etc., it is desired to provide a fixing means which makes it possible to easily attach parts made of EPDM or similar parts made of a rubber.

To satisfy the above-described requirements, for example, a trial of using a pressure sensitive adhesive tape comprising a hot-melt layer on a pressure sensitive adhesive layer is made. That is, after the adhesion was exerted by heating the hot-melt layer, the hot-melt layer is adhered to a weather-strip made of EPDM as an adherend and, furthermore, the adhesive layer is attached to the predetermined portion of the automobile. However, heating of the hot-melt layer of the adhesive tape generally require a high-cost large-scaled equipment and the attaching rate is also small.

Japanese Unexamined Patent Publication (Kokai) No. 7-268299 discloses a fluid adhesive composition capable of directly adhering to EPDM, which is useful for application of a film-like roofing, although the fluid adhesive composition is not used for attaching the weather-strip made of EPDM to the automobile. This adhesive composition contains polychloroprene as a main component. However, this adhesive composition is not particularly preferable in the production line of the automobile in view of the recent environmental protection of using no solvent because a solvent must be used in combination with polychloroprene.

Furthermore, Japanese Unexamined Patent Publication (Kokai) No. 7-138447 discloses a pressure sensitive adhesive obtained by incorporating a block copolymer of a vinyl aromatic monomer, isobutylene and a vinyl aromatic monomer. This pressure sensitive adhesive has such a drawback that the heat resistance is inferior because the main component is a block copolymer and has no crosslinking. This adhesive can show only considerably poor adhesion under severe conditions of comparatively high temperature to which the weather-strip is exposed.

SUMMARY OF THE INVENTION

A general object of the present invention is to solve one or more of the above-described problems of the prior art and to provide an improved pressure sensitive adhesive composition which makes it possible to adhere to an adherend having low surface energy within a wide temperature range from ultra-low temperature to high temperature due to good adhesive strength and holding characteristics.

It is desirable for a pressure sensitive adhesive composition, according to the present invention, to be easily handled and cause no environmental problems as a result of use of a solvent.

It is also desirable for a pressure sensitive adhesive composition, according to the present invention, to be advantageously used for attaching parts made of a rubber, particularly parts made of EPDM, to vehicles such as automobile, etc.

It is further desirable to provide a pressure sensitive adhesive product, according to the present invention, using the above-described pressure sensitive adhesive composition.

In one aspect thereof, the present invention provides a pressure sensitive adhesive composition comprising a random copolymer of isobutylene and paramethylstyrene, and a tackifier, wherein said random copolymer contains 1 to 20% by weight of said paramethylstyrene and has a crosslinked structure.

In another aspect thereof, the present invention provides a pressure sensitive adhesive product using the pressure sensitive adhesive composition of the present invention.

DETAILED DESCRIPTION OF EMBODIMENTS OF THE INVENTION

As described in detail hereinafter, the pressure sensitive adhesive composition of the present invention has excellent adhesion to an adherend having low surface energy, which is represented by rubbers such as EPDM, etc. and TSOP series of TOYOTA Co., Ltd. (TOYOTA Super Olefin Plastic: trade name) at not only normal temperature but also high temperature.

As described above, the pressure sensitive adhesive composition of the present invention comprises a random copolymer of isobutylene and paramethylstyrene, and a tackifier, wherein said random copolymer contains 1 to 20% by weight of said paramethylstyrene and has a crosslinked structure. This polymer has basically a structure in which the random copolymer of isobutylene and paramethylstyrene is crosslinked by using a crosslinking agent in view of the heat resistance. This kind of a random copolymer is, for example, commercially available from Exxon Chemical Co. under the trade name of EXXPRO series, and examples thereof include MDX90-10, MDX89-4. A part of methyl groups at the para-position of this paramethylstyrene can be brominated to form a site for crosslinking. Accordingly, a crosslinked structure can be formed by the technique described in detail hereinafter. Particularly, regarding the copolymer MDX90-10, 1.2% by mol of paramethylstyrene, which is contained in the copolymer in the amount of 7.5% by weight, is brominated. Regarding MDX89-4, 0.75% by mol of paramethylstyrene, which is contained in the copolymer in the amount of 5% by weight, is brominated. In addition, bromination of paramethylstyrene and random polymerization between isobutylene and paramethylstyrene, for the purpose of producing a random copolymer, can be performed by using a technique which is general in the polymer chemistry.

A feature of paramethylstyrene contained in the above-described random copolymer does not lie in only formation of the above-described crosslinked point for deriving excellent adhesion within the range from normal temperature to high temperature. Paramethylstylene can also impart heat resistance and strength to the copolymer by the cohesive force and hardness of paramethylstyrene itself. To obtain such an operation/working effect, paramethylstyrene is preferably contained in the copolymer of isobutylene and paramethylstyrene in the amount of about 1 to 20 parts by weight based on the total amount of the copolymer. When the amount of paramethylstyrene is smaller than 1 part by weight, the cohesive force is insufficient and it becomes difficult to obtain enough adhesion to endure practical use. On the other hand, when the amount of paramethylstyrene is larger than 20 parts by weight, the flexibility is drastically lowered and the adhesion as an important characteristics of the adhesive disappears and, therefore, it becomes impossible to refer to it as a pressure sensitive adhesive any longer.

The random copolymer used in the present invention preferably has a crosslinked structure so as to inhibit the adhesion at high temperature from decreasing. Actually, if the random copolymer has no crosslinked structure, the cohesive force is insufficient when the pressure sensitive adhesive composition is exposed to high-temperature conditions. Therefore, socalled adhesive transfer is liable to arise. The crosslinking of the random copolymer can be basically performed by using a technique such as vulcanization, etc., as is generally performed in the field of polymer chemistry. However, in case of the vulcanization, the random copolymer must be exposed to high reaction temperature and long reaction time. Accordingly, in the present invention, the crosslinking is preferably performed by utilizing bromine atoms capable of forming a crosslinked point in paramethylstyrene, using an amine crosslinking agent, as is specifically employed in the following examples. A suitable crosslinking agent is not specifically limited, but includes triethylenetetramine (TETA), 4,4-trimethylene dipiperidine (TMDP), di-4-picolylamine, etc. The amount of such a crosslinking agent can vary widely according to the kind of the crosslinking agent to be used. For example, when the crosslinking agent is TETA, it is preferably used in the amount of about 0.05 to 1 part by weight based on 100 parts by weight of the copolymer. When the amount of TETA is smaller than 0.05 parts by weight, the cohesive failure of the adhesive tends to arise in case of using the pressure sensitive adhesive composition at comparatively high temperature such as 80° C., etc. On the other hand, when the amount is larger than 1 part by weight, the adhesive becomes too hard after crosslinking because of its cohesive force and, therefore, the adhesion required of the adhesive and flexibility disappear.

In the pressure sensitive adhesive composition of the present invention, a tackifier is used in combination with the above-described specific random copolymer. There can be used various tackifiers, which have generally been known in this technical field. To form a pressure sensitive adhesive composition, which is particularly superior in adhesion characteristics at high temperature, in case of carrying out the present invention, for example, there can be advantageously used hydrocarbon resin such as Regalrez 6108 (trade name) manufactured by Hercules Co., and completely hydrogenated rosin such as MGB279 and MGB275 (trade name) manufactured by Hercules Co. The amount of such a tackifier used can vary widely according to factors such as desired effect, etc., but is normally used in the amount of preferably from about 50 to 150 parts by weight based on 100 parts by weight of the copolymer. When the amount of the tackifier is smaller than 50 parts by weight, since the feature of a rubber is strongly exerted, an adhesive is hardly obtained. On the other hand, when the amount is larger than 150 parts by weight, only the feature of the tackifier becomes stronger. As a result, the resultant is too hard to obtain a pressure sensitive adhesive.

The pressure sensitive adhesive composition of the present invention may contain other additives, if necessary. To improve the tack and adhesion at low temperature, for example, there may be added a plasticizer, which is commercially available from Shell Co. under the trade name of Shellflex SF-371JY, to the adhesive composition in a predetermined amount, preferably 50 parts by weight or less.

For the same purpose as that of the above-described plasticizer, there may be added other flexible rubber components, for example, liquid isobutylene rubber, which is commercially available from TONEX Co. under the trade name of Vistanex series, and styrene-butadine rubber (SBR), which is commercially available from Asahi Kasei Co., Ltd. under the trade name of Asaprene #1205, to the pressure sensitive adhesive composition in a predetermined amount, preferably 50 parts by weight or less.

The pressure sensitive adhesive composition of the present invention can provide various pressure sensitive adhesive products by using the same. The pressure sensitive adhesive products of the present invention can take various forms and are not limited to a specific form, but typical examples of preferable adhesive product are adhesive products obtained by applying a pressure sensitive adhesive composition to a fiber material such as woven fabric, non-woven fabric, etc. or impregnating the fiber material with the pressure sensitive adhesive composition; and adhesive products obtained by applying a pressure sensitive adhesive composition to a foamed substrate such as acrylic foam, urethane foam, polyethylene foam, etc. or a substrate such as plastic film (e.g. polyester film, etc.) and paper (e.g. cellophane, etc.). Specific examples thereof include pressure sensitive adhesive tape, pressure sensitive adhesive sheet, pressure sensitive adhesive foam, foam tape, transfer type tape, double-coated tape, etc.

The pressure sensitive adhesive product of the present invention can be produced by using various techniques, which have been known, in this technical field. Showing one embodiment of the production method, which can be advantageously used for carrying out the present invention, selected raw materials such as random copolymer, tackifier, plasticizer, etc. are first dissolved in toluene or other solvents to prepare a coating solution. Then, the resulting coating solution is applied on a substrate such as polyester film, etc., and removal of the solvent due to drying and crosslinking of the copolymer are performed by heating the coated substrate at a predetermined temperature for a predetermined time. According to such a simple production method, an expected pressure sensitive adhesive product can be obtained.

According to another method, the pressure sensitive adhesive product of the present invention can also be produced by a hot-melt method using an extruder.

Furthermore, good adhesion can be exerted by heating the pressure sensitive adhesive product of the present invention to a suitable temperature when the resulting adhesive product is applied to an adherend.

EXAMPLES

The present invention will be described in more detail with reference to the following examples. It will be appreciated that the present invention is not limited to the following examples.

Example 1

As the raw material, the following rubber and tackifier were prepared in the amount described below.

| | |
|---|---|
| Random copolymer of Isobutylene and paramethylstyrene (trade name of EXXPRO MDX90-10, manufactured by Exxon Chemical Co.) | 100 Parts by weight |
| Tackifier (trade name of Regalrez 6108, manufactured by Hercules Co.) | 100 Parts by weight |

These raw materials were dissolved in toluene to prepare a solution containing a nonvolatile content of about 25% by weight. Furthermore, 0.12 parts by weight of triethylene tetraamine (TETA) as a crosslinking agent was added to the resulting solution, followed by sufficient stirring. After stirring, a solution containing TETA was coated using a hand coater on a polyester film, the surface of which was subjected to a removing treatment with a silicone, so that a layer thickness after drying is 50 µm. Thereafter, the polyester film with an adhesive layer was put in an oven and heated at a temperature of 120° C. for 20 minutes to perform drying with heating and crosslinking reaction of the adhesive. The adhesive layer was cured to obtain a transfer type pressure sensitive type adhesive tape body.

Then, a surface modifier containing an acrylic polymer and polyisocyanate as a main component (trade name of JPM-790 manufactured by Sumitomo 3M Co., Ltd.) was coated on one surface of the transfer type pressure sensitive adhesive tape body in a layer thickness of 2 to 5 µm, followed by drying with heating in an oven at 70° C. for 5 minutes. Then, this transfer type pressure sensitive adhesive tape body was laminated on an acrylic foam core at a normal temperature via its surface coated with the surface modifier. The acrylic foam core used herein is that prepared according to the procedure of producing a typical tape described in U.S. Pat. No. 4,415,615 to Esmay et al., and is preferably a copolymer comprising 50 to 100 parts by weight of a monomer of substituted or non-substituted alkyl acrylate or methacrylate and 0 to 50 parts by weight of a copolymerizable monoethylene substituted monomer and, furthermore, the thickness was 1.2 mm. The monomers, which can be advantageously used for production of such an acrylic foam core, are disclosed in U.S. Reissue Pat. No. 24,906 to Ulrich. An acrylic foam tape as the pressure sensitive adhesive product of the present invention was obtained through a series of production processes as described above.

Examples 2 to 5

The procedure described in Example 1 was repeated to produce an acrylic foam tape. However, in this example, the amount of TETA as the crosslinking agent added was changed as follows from 0.12 parts by weight, respectively.

| | |
|---|---|
| Example 2 | 0.14 parts by weight |
| Example 3 | 0.15 parts by weight |
| Example 4 | 0.20 parts by weight |
| Example 5 | 0.25 parts by weight |

Example 6

The procedure described in Example 1 was repeated to produce an acrylic foam tape. However, in this example, EXXPRO MDX89-4 manufactured by Exxon Chemical Co. was used as the random copolymer of isobutylene and paramethylstyrene in place of EXXPRO MDX90-10 manufactured by Exxon Chemical Co. in the same amount, and the amount of TETA as the crosslinking agent added was changed to 0.14 parts by weight from 0.12 parts by weight.

Example 7

The procedure described in Example 6 was repeated to produce an acrylic foam tape. However, in this example, the amount of TETA as the crosslinking agent added was changed from 0.14 parts by weight to 0.16 parts by weight.

Example 8

The procedure described in Example 1 was repeated to produce an acrylic foam tape. However, in this example, Foral 105 (trade name) manufactured by Hercules Co. was used as the tackifier in place of Regalrez 6108 manufactured by Hercules Co. in the same amount, and the amount of TETA as the crosslinking agent added was changed to 0.14 parts by weight from 0.12 parts by weight.

Example 9

The procedure described in Example I was repeated to produce an acrylic foam tape. However, in this example, in case of preparing a solution containing a random copolymer of isobutylene and paramethylstyrene and a tackifier, 10 parts by weight of a liquid isobutylene rubber: Vistanex LM-MS (trade name) manufactured by TONEX Co. was further added, and the amount of TETA as the crosslinking agent added was changed to 0.14 parts by weight from 0.12 parts by weight.

Example 10

The procedure described in Example 9 was repeated to produce an acrylic foam tape. However, in this example, the amount of the liquid isobutylene rubber: Vistanex LM-MS was changed to 30 parts by weight from 10 parts by weight.

Example 11

The procedure described in Example I was repeated to produce an acrylic foam tape. However, in this example, in case of preparing a solution containing a random copolymer of isobutylene and paramethylstyrene and a tackifier, 10 parts by weight of a plasticizer: Shellflex SF-371JY (trade name) manufactured by Shell Co. was further added, and 0.17 parts by weight of 4,4trimethylene dipiperidine (TMDP) was used as the crosslinking agent in place of TETA.

Example 12

The procedure described in Example 11 was repeated to produce an acrylic foam tape. However, in this example, the amount of Shellflex SF-317JY as the plasticizer was changed to 20 parts by weight from 10 parts by weight.

Comparative Example 1

In this example, for a comparison test, a commercially available acrylic foam tape i.e. acrylic foam tape #5373 for low surface energy adherend manufactured by Sumitomo 3M Co., Ltd. was prepared.

Comparative Example 2

The procedure described in Example 1 was repeated to produce an acrylic foam tape. However, in this example, for a comparison test, use of TETA as the crosslinking agent was omitted.

Comparative Example 3

The procedure described in Example 6 was repeated to produce an acrylic foam tape. However, in this example, for a comparison test, use of TETA as the crosslinking agent was omitted.

Evaluation Test

Using the acrylic foam tapes produced in Examples 1 to 12 and Comparative Examples 1 to 3 as a test tape, (1) adhesive strength, (2) heat-resistant holding force and (3) low-temperature shear strength were evaluated according to the following procedures.

(1) Adhesive Strength

The adhesive strength was evaluated by a 180° peel test under different temperature conditions: normal temperature (about 25° C.) and 80° C.

Three kinds of rubber members: EPDM (solid type and sponge type) manufactured by Hotta Gomu Co., Ltd. and TSOP-1 (trade name) were prepared as the adherend, and each test tape was applied to a predetermined portion. The test tape used herein is a slit-like tape obtained by backing the back surface of the evaluation surface of the previously produced tape by using a polyester film having a thickness of 50 µm and cutting the tape into strips of 12 mm in width. Then, in order to apply the test tape to the adherend under pressure, a reciprocating motion of a roller having a weight of 2 kg was performed on the tape. The test piece thus obtained was allowed to stand at a normal temperature for one day and a 180° peel test was performed by using a tensile tester manufactured by Shimadzu Corp. In this case, a stress rate was set to 50 mm/minute.

Then, a 180° peel test at 80° C. was performed in the same as described above However, the test was performed as follows. That is, a test piece was allowed to stand at a normal temperature for one day and then allowed to stand in an atmosphere of a temperature of 80° C. for 30 minutes.

The results of the 180° peel tests at a normal temperature and 80° C. are described in Table 1 below. In Table 1, AT shows that a cohesive failure arose in the adhesive.

(2) Heat-resistant Holding Force

A rubber member: EPDM (solid type, size: about 30 mm×70 mm×5 mm) manufactured by Hotta Gomu Co., Ltd. was prepared as the adherend. After the acrylic foam tapes were cut into pieces having the size of 25 mm×25 mm, each tape piece was fixed by applying the evaluation surface of each tape piece to a predetermined portion of this adherend and applying the back surface of the evaluation surface to a stainless steel panel, respectively. The resulting test piece was allowed to stand at a normal temperature for one day and placed in an oven at 90° C. in a perpendicular position and, furthermore, the stainless steel panel side of the test piece was fixed to the oven. After adding a load of 1 kg to the adherend, resulting in limit of the heat-resistant holding force, the time (minutes) required for the adherend to drop from the test piece was measured. The resulting measured results are described in Table 1 below.

(3) Low-temperature Shear Strength

A rubber member: EPDM (solid type, size: about 30 mm×70 mm×5 mm) manufactured by Hotta Gomu Co., Ltd. was prepared as the adherend. After the acrylic foam tapes were cut into pieces having the size of 25 mm×10 mm, each tape piece was fixed by applying the evaluation surface of each tape piece to a predetermined portion of this adherend and applying the back surface of the evaluation surface to a plate coated with melamine alkyd resin paint, respectively. The resulting test piece was allowed to stand at a normal temperature for one day, and the shear strength (kg/cm 2) of the test piece cooled to 30° C. for one or more hours was measured by using a tensile tester having a cooling function manufactured by Shimadzu Corp. In this case, the stress rate was set to 2 mm/minutes. The resulting measured results are described in Table 1 below.

TABLE 1

| | 180° peel adhesion (kg/12 mm) | | | | | | Static Shear | Dynamic shear |
| | Room temperature | | | 80° C. | | | | (at −30° C., |
| | EPDM (solid) | EPDM (sponge) | TSOP-1 | EPDM (solid) | EPDM (sponge) | TSOP-1 | (at 90° C., min) | kg/cm$^2$) |
|---|---|---|---|---|---|---|---|---|
| Examples | | | | | | | | |
| 1 | 2.62 | 0.87 | | 0.81 | 0.63 | | | |
| 2 | 2.34 | 0.69 | | 0.9 | 0.75 | | | |
| 3 | 2.58 | 1.02 | | 0.91 | 0.63 | | | |
| 4 | 2.16 | 0.56 | | 0.84 | 0.47 | | | |
| 5 | 1.95 | 0.69 | | 0.5 | 0.64 | | | |
| 6 | 1.47 | 1.62 | | 0.72 | 0.42 | | | |
| 7 | 1.65 | 1.11 | | 0.78 | 0.71 | | | |
| 8 | 1.91 | | 2.2 | 0.62 | | 0.53 | 5000 over | |
| 9 | 2.25 | 2.22 | | 0.52 | | 0.68 | 5000 over | |
| 10 | 2.57 | 2.25 | | 0.48 | | 0.65 | 5000 over | |
| 11 | 1.13 | | | 0.47 | | 0.55 | | 23 |
| 12 | 1.18 | | | 0.52 | | 0.82 | | 22.9 |

TABLE 1-continued

| | 180° peel adhesion (kg/12 mm) | | | | | | Static Shear | Dynamic shear |
|---|---|---|---|---|---|---|---|---|
| | Room temperature | | | 80° C. | | | (at 90° C., min) | (at −30° C., kg/cm²) |
| | EPDM (solid) | EPDM (sponge) | TSOP-1 | EPDM (solid) | EPDM (sponge) | TSOP-1 | | |
| (Comp. Example) | | | | | | | | |
| 1 | 0.86 | 0.36 | | 0.03 | 0.03 | | 3 | |
| 2 | 2.32 | 1.61 AT | | 0.21 AT | 0 AT | | 5 | |
| 3 | 1.94 | 1.36 AT | | 0.21 AT | 0 AT | | 3 | |

AT: Cohesive failure of adhesive

As is apparent from the results described in Table 1, the acrylic foam tapes produced in Examples 1 to 5 have excellent adhesive strengths enough to endure practical use to the adherend within the range from low temperature to high temperature. In Examples 6 and 7, even if the flexibility is imparted by decreasing the content of paramethylstyrene as the main component in the copolymer, the acrylic foam tapes still have excellent adhesive strength. In Examples 8 to 12, even if the tackifier used in combination is changed or additional use of the rubber component or plasticizer is performed, the acrylic foam tapes still have excellent adhesive strength.

To the contrary, the acrylic foam tape using a general synthetic rubber transfer type pressure sensitive adhesive tape of Comparative Example 1 can not avoid a drastic decrease in adhesive strength at high temperature as is apparent from the results shown in Table 1. It has been found that, in case of acrylic foam tapes as a transfer type pressure sensitive adhesive tape wherein a random copolymer of isobutylene and paramethylstyrene is contained as a main component but the copolymer has no crosslinked structure (Comparative Examples 2 and 3), the pressure sensitive adhesive is transferred at the pressure sensitive adhesive layer of the transfer type pressure sensitive adhesive tape at high temperature, it has also been found that, when the adherend is particularly a sponge type EPDM, the pressure sensitive adhesive is transferred even at a normal temperature, it is considered that this is caused by an influence of oil as a transfer component from the EPDM side.

As is apparent from these facts, in the present invention, a crosslinked structure such as network structure, etc, is imparted to the copolymer constituting the adhesive, thereby making it possible to inhibit a decrease in adhesive strength at high temperature and a decrease in cohesive force derived from the transfer component.

Effect of the Invention

As described above, according to the present invention, there is provided a pressure sensitive adhesive composition, (1) which can exhibit good adhesive strength and holding characteristics within a wide temperature range from ultra-low temperature to high temperature to an adherend of a rubber such as EPDM, or a plastic material (e.g. polypropylene, etc.) obtained by incorporating a rubber;

(2) which can be applied to an adherend with excellent weathering resistance even under severe conditions such as high temperature, etc.; and (3) which does not cause problems of environmental pollution.

The pressure sensitive adhesive composition of the present invention can be advantageously used for attachment of rubber or rubber-containing plastic products to vehicles such as automobile, etc., particularly.

What is claimed is:

1. A pressure sensitive adhesive weather-strip tape comprising:
    (a) a substrate having two opposing surfaces; and comprising a foam polymer selected from the group consisting of acrylic foam, urethana foam, and polyethylene foam; and
    (b) a pressure sensitive adhesive composition bonded to a surface of said substrate, said adhesive composition comprising:
        (i) a random copolymer of isobutylene and paramethylstyrene,
        wherein said random copolymer contains 1 to 20% by eight of the paramethylstyrene and has a crosslinked structure,
        (ii) a tackifier, and
        (iii) an amine crosslinking agent, capable of performing cross-linking by utilizing brominated sites in the paramethylstyrene,
    wherein said adhesive composition contains 50 to 150 parts by weight f said tackifier based on 100 parts by weight of said copolymer and is substantially solvent free, the combination of substrate and pressure sensitive adhesive being useful as a weather-strip.

2. A pressure sensitive adhesive weather-strip tape comprising:
    (a) a substrate having two opposing surfaces; and
    (b) a pressure sensitive adhesive composition bonded to a surface of said substrate, said adhesive composition comprising:
        (i) a random copolymer of isobutylene and paramethylstyrene,
        wherein said random copolymer contains 1 to 20% by weight of the paramethylstyrene and has a crosslinked structure,
        (ii) a tackifier, and
        (iii) an amine crosslinking agent selected from the group consisting of triethylenetetramine, 4,4-trimethylene dipiperidine, and di-4-picolylamine,
        wherein said adhesive composition contains 50 to 150 parts by weight of said tackifier based on 100 parts by weight of said copolymer and is substantially solvent free.

3. An article to be attached to a vehicle, said article comprising rubber and a pressure sensitive adhesive bonded to a surface of the rubber, said pressure sensitive adhesive consisting essentially of:
    (i) a random copolymer of isobutylene and paramethylstyrene,
    wherein said random copolymer contains 1 to 20% by weight of the paramethylstyrene and has a crosslinked structure and (ii) a tackifier, wherein said pressure sensitive adhesive contains 50 to 150 parts by weight of said tackifier based on 100 parts by weight of said copolymer.

4. The article of claim 3 wherein said adhesive further comprises a crosslinking agent.

5. The article of claim 3 wherein the vehicle is an automobile.

6. The article of claim 3 which is a weather-strip.

7. The weather-strip of claim 6 which is bonded to peripheral portions of a door of said vehicle.

8. A pressure sensitive adhesive composition consisting essentially of:
- a) a random copolymer of isobutylene and paramethylstyrene,
- b) a tackifier, and
- c) an amine crosslinking agent; capable of performing cross-linking by utilizing brominated sites in the paramethylstyrene, wherein:

said random copolymer contains 1 to 20% by weight of said paramethylstyrene and has a crosslinked structure, and said adhesive composition contains 50 to 150 parts by weight of said tackifier per 100 parts by weight of said copolymer.

9. An adhesive tape comprising the pressure sensitive adhesive composition of claim 8 on a surface of the tape.

10. A pressure sensitive adhesive consisting essentially of:
- a) a random copolymer of isobutylene and paramethylstyrene,
- b) a tackifier;
- c) an amine crosslinking agent capable of performing cross-linking by utilizing brominated sites in the paramethylstyrene; and
- d) a plasticizer; wherein:

said random copolymer contains 1–20% by weight of paramethylstyrene and has a crosslinked structure, and said pressure-sensitive adhesive contains 50–150 parts by weight of said tackifier per 100 parts by weight of said copolymer.

* * * * *

UNITED STATES PATENT AND TRADEMARK OFFICE
CERTIFICATE OF CORRECTION

PATENT NO. : 6,861,139 B2
DATED : March 1, 2005
INVENTOR(S) : Takeda, Satoshi

It is certified that error appears in the above-identified patent and that said Letters Patent is hereby corrected as shown below:

Column 3,
Line 20, delete "Paramethylstylene" and insert in place thereof -- Paramethylstyrene --.
Line 41, delete "socalled" and insert in place thereof -- so called --.

Column 9,
Line 39, after "temperature" delete "," and insert in place thereof -- . --.
Lines 39 and 42, delete "it" and insert in place thereof -- It --.
Line 42, after "temperature" delete "," and insert in place thereof -- . --.

Column 10,
Line 19, after "surfaces" delete ";".
Line 28, delete "eight" and insert in place thereof -- weight --.
Line 36, delete "f" and insert in place thereof -- of --.

Column 11,
Line 17, after "agent" delete ";".

Signed and Sealed this

Second Day of August, 2005

JON W. DUDAS
*Director of the United States Patent and Trademark Office*